US00RE46413E

(19) United States
(12) Reissued Patent
Ainsworth

(10) Patent Number: US RE46,413 E
(45) Date of Reissued Patent: May 23, 2017

(54) GAMING MACHINE

(71) Applicant: Ainsworth Game Technology Ltd., Newington (AU)

(72) Inventor: Leonard H. Ainsworth, Chiswick (AU)

(73) Assignee: Ainsworth Game Technology Limited, Newington, NSW (AU)

(21) Appl. No.: 14/515,490

(22) Filed: Oct. 15, 2014

Related U.S. Patent Documents

Reissue of:
(64) Patent No.: 6,544,120
Issued: Apr. 8, 2003
Appl. No.: 09/862,182
Filed: May 21, 2001

(30) Foreign Application Priority Data

May 22, 2000 (AU) ..... PQ8695

(51) Int. Cl.
*G07F 17/34* (2006.01)
*G07F 17/32* (2006.01)

(52) U.S. Cl.
CPC ..... *G07F 17/34* (2013.01); *G07F 17/3244* (2013.01)

(58) Field of Classification Search
CPC ..... G07F 17/34; G07F 17/3244
USPC ..... 463/13–24
See application file for complete search history.

(56) References Cited

U.S. PATENT DOCUMENTS 4,198,052 A * 4/1980 Gauselmann ..... 273/143 R
4,240,635 A 12/1980 Brown
5,364,100 A 11/1994 Ludlow et al.
5,722,891 A 3/1998 Inoue
5,775,692 A 7/1998 Watts et al.
5,823,873 A * 10/1998 Moody ..... A63F 1/00 273/292
5,848,932 A * 12/1998 Adams ..... 273/143 R
5,868,619 A * 2/1999 Wood ..... G07F 17/3244 273/292
5,919,088 A 7/1999 Weiss
5,997,401 A 12/1999 Crawford
6,062,980 A 5/2000 Luciano
6,117,009 A * 9/2000 Yoseloff ..... G07F 17/3244 273/138.1
6,155,925 A * 12/2000 Giobbi ..... G07F 17/3244 273/138.1
6,159,095 A 12/2000 Frohm et al.
6,159,098 A * 12/2000 Slomiany ..... G07F 17/32 273/139
6,190,255 B1 * 2/2001 Thomas ..... G07F 17/32 463/20

(Continued)

FOREIGN PATENT DOCUMENTS

EP 0950998 10/1999
GB 1444085 7/1976

(Continued)

*Primary Examiner* — John M Hotaling
(74) *Attorney, Agent, or Firm* — Cook Alex Ltd.

(57) ABSTRACT

A spinning reel video poker machine that displays an initial array of symbols that may be on a simulation of spinning reels (R1, R2, R3, R4, R5). In response to a trigger additional symbols will become available on the video screen to extend existing paylines or provide new paylines. The new paylines may be part of an extension to an existing array or they may be part of a separate array of symbols or set of reels that becomes available in response to the trigger.

13 Claims, 4 Drawing Sheets

(56) References Cited

U.S. PATENT DOCUMENTS

| | | | | |
|---|---|---|---|---|
| 6,224,482 | B1 * | 5/2001 | Bennett | G07F 17/32 273/143 R |
| 6,227,971 | B1 * | 5/2001 | Weiss | 463/20 |
| 6,241,607 | B1 * | 6/2001 | Payne | G07F 17/34 273/143 R |
| 6,254,481 | B1 * | 7/2001 | Jaffe | A63F 13/10 273/143 R |
| 6,312,334 | B1 * | 11/2001 | Yoseloff | G07F 17/32 273/138.1 |
| 6,322,445 | B1 | 11/2001 | Miller | |
| 6,379,245 | B2 | 4/2002 | De Keller | |
| 6,443,837 | B1 * | 9/2002 | Jaffe | G07F 17/32 463/16 |
| 6,454,649 | B1 * | 9/2002 | Mattice | G07F 17/32 463/16 |
| 6,558,253 | B1 | 5/2003 | DeSimone et al. | |
| 6,612,574 | B1 | 9/2003 | Cole et al. | |
| 6,656,040 | B1 | 12/2003 | Brosnan et al. | |
| 6,656,046 | B1 * | 12/2003 | Yoseloff | G07F 17/3213 463/16 |
| 7,762,882 | B2 | 7/2010 | Okada | |
| 8,298,073 | B2 | 10/2012 | Bryant | |
| 2001/0048193 | A1 * | 12/2001 | Yoseloff | G07F 17/32 273/138.1 |
| 2001/0053712 | A1 * | 12/2001 | Yoseloff | G07F 17/3202 463/1 |

FOREIGN PATENT DOCUMENTS

| | | |
|---|---|---|
| GB | 2 130 413 A | 5/1984 |
| GB | 2130413 | 5/1984 |
| GB | 2292245 | 2/1996 |
| GB | 1464896 | 2/1997 |
| GB | 2327794 | 2/1999 |
| WO | WO 97/27569 | 7/1997 |
| WO | WO 98/07124 | 2/1998 |
| WO | WO 00/08613 | 2/2000 |

* cited by examiner

GAMING MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue of U.S. Pat. No. 6,544,120 issued Apr. 8, 2003.*

FIELD OF THE INVENTION

The present invention relates to gaming machines and in particular to rotating reel type gaming machines. The invention has been developed primarily for computerised, spinning reel video poker machines and will be described herein with reference to that application. However, it will be appreciated that the invention is not limited to that particular field of use and may be suitable for many other applications.

BACKGROUND OF THE INVENTION

Gaming machines have long been known and are now one of the most common forms of gambling. One of the oldest and best known forms of gaming machines is the rotating reel type "poker machine". These machines use a series of three or more reels, each reel having symbols on its peripheral edge. The reels are rotated upon placing a bet and then stopped to produce an array of randomly selected symbols. Winnings are paid if the random combination of symbols matches one of the predetermined winning combinations.

Recently these gaming machines have been computerised with a video display replacing the physically rotating reels. The display screen presents an array of symbols in five columns and three rows equating to the symbols that would normally be seen on the five rotating reels of an equivalent old style mechanical machine. Computerised machines have allowed players to bet on combinations of symbols other than just those in the central row which was traditionally the only line of symbols considered in the mechanical machines. Today these machines will typically offer players the opportunity to simultaneously bet on the combinations in various "paylines" (as they are known) extending through the array. Eventually, all the practical "paylines" have become standard on most machines and game developers have looked to subsidiary or secondary games in an effort to further increase gaming enjoyment for players. A secondary game might typically involve a simulated horse race or a moving symbol that randomly changes symbols in the array of the primary game. The secondary games are often referred to as "features". The feature would appear upon some trigger event such as a predetermined outcome in the primary game. The feature game can be used to alter the "volatility" of the gaming machine to maintain the players interest and enhance the gaming experience.

The "volatility" the gaming machine refers to the expected frequency of wins and the corresponding amount paid for each win. Overtime, all gaming machines return a set percentage of the bets received as winnings. Otherwise the machine would not make a profit. However, a machine with high volatility will return this percentage through fewer wins of high value and a low volatility machine provides more wins of less value.

Unfortunately, this generally gives the gaming machine only two set levels of volatility, that is, the volatility of the pi game and the volatility of the feature game. Therefore, the gaming machine designer has no scope to vary the volatility in an incremental manner in an effort to fiber chance the gaming experience.

SUMMARY OF THE INVENTION

It is an object of the present invention to overcome or ameliorate at least one of the disadvantages of the prior art, or to provide a useful alternative.

According to a fast aspect, the present invention provides a gaming machine adapted to:

display an array of randomly selected symbols and pay winnings on the occurrence of predetermined winning combinations of symbols, wherein upon a trigger event, the number of symbols displayed increases so that the machine can also pay winnings on winning combinations resulting from the increased number of symbols.

In one form, a single additional symbol is added to the array in response to the trigger event. However, two or more symbols may be added in response to the trigger event and in some forms an entirely new and separate array of symbols may appear in response to the trigger.

According to a second aspect, the present invention provides a gaming machine adapted to:

display an array of randomly selected symbols and pay winnings on the occurrence of predetermined winning combinations of the symbols; wherein, at least one column of the array has more than three of the symbols; or, at least one row of the array has more than five of the symbols.

It will be appreciated that the term "pay winnings" encompasses a machine that dispenses legal tender or tokens that can later be redeemed for money, as well as a machine that awards gaming credits which can be used to bet on future games or converted to money. Typically, computerised gaming machines will pay wings by awarding credits that are tallied on a credit meter displayed on the video screen. Betting with electronically recorded credits is more convenient than physically feeding coins or tokens into the machine with each single gaming operation.

By adopting an array that extends beyond the typical five column, three row array, the machine can offer paylines that inherently have a better chance of achieving a winning combination, such as three matching symbols. By varying the number of additional symbols added to a five column, three row array and controlling when and how the player may gain access to paylines that include the additional symbol, the game designer is able to make subtle variations in the volatility.

Preferably, the array initially has five columns and three rows; and, one or more additional symbols are added to extend the array upon a predetermined trigger event. In one particularly preferred form, the trigger event is a predetermined combination of the symbols in the array.

According to a third aspect, the present invention provides a gaming machine adapted to:

display an array of randomly selected symbols and pay winnings on the occurrence of predetermined winning combinations of the symbols; wherein at least one additional symbol is added to extend the array upon a predetermined trigger event. As discussed above, the trigger event may conveniently be one or more predetermined combinations of the symbols in the array or it may simply be a player actuated trigger provided on the control console.

According to a fourth aspect, the present invention provides a gaming machine adapted to:

display an initial array of randomly selected symbols and pay winnings on the occurrence of predetermined winning combinations of the symbols in the initial array; wherein, at least one additional array of random symbols becomes available for gaming upon a predetermined trigger event.

Again the trigger event could be one or more trigger combinations of symbols occurring in the initial array.

In a further preferred form a trigger combination in any of the additional arrays can in turn trigger still further arrays to become available for gaming.

By providing an additional array of symbols, the machine can be configured to give the player a second chance of winning or allow two standard arrays to be played simultaneously. Furthermore, if a predetermined combination of symbols appear in the second array, the machine can provide a third array and so on.

According to another aspect, the present invention provides a gaming machine adapted to:

display a random array of symbols and pay winnings on the occurrence of predetermined winning combinations of the symbols; wherein, during use, the array is capable of adopting a non-rectangular configuration.

For a significant number of players the feature games may marginally enhance gaming enjoyment however, the primary source of enjoyment is provided by the basic game which has traditionally adhered to the five column, three row format. The present invention provides scope for significant increases in gaming enjoyment by allowing incremental departures from the traditional five column, three row array. With the extension of rows and/or columns, the player has the option of playing extended lines of symbols which would have correspondingly different probabilities of returning a winning combination and therefore a chance for a higher winning payout.

BRIEF DESCRIPTION OF THE DRAWINGS

The invention will now be described, by way of example only, with reference to the accompanying drawing, in which.

DETAILED DESCRIPTION OF THE PREFERRED EMBODIMENT

Figure 2:
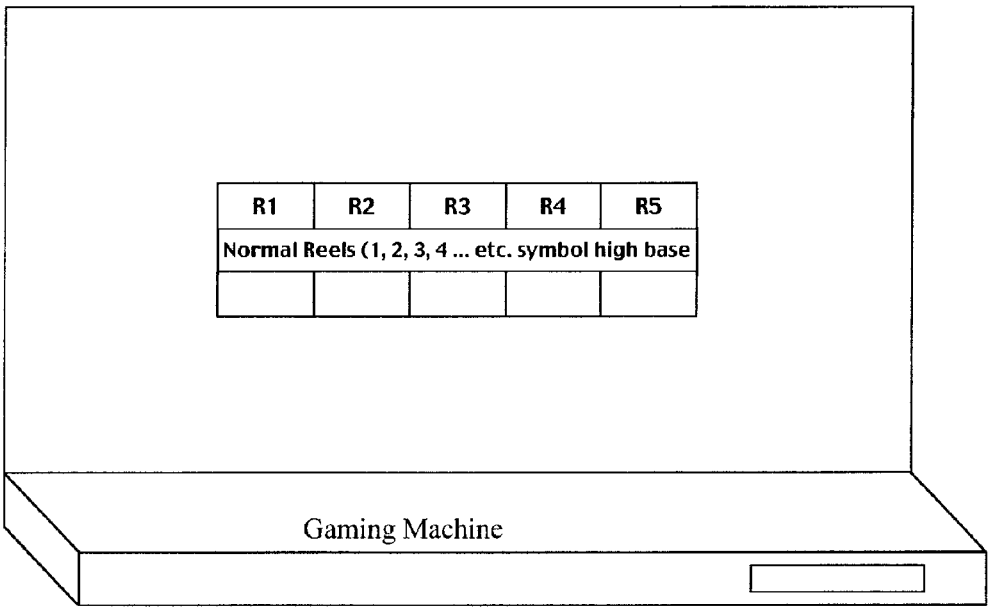
FIG. 2 shows a schematic representation of a gaming machine with a display screen showing the traditional set of five adjacent reels used by the base game.

Referring to FIG. 2, the traditional base game consists of five columns, R1, R2, R3, R4 and R5 symbolising the mechanical reels used in a typical version of the original machines. Each column has three symbols, again because in the original mechanical versions of the game, only three of the symbols on the peripheral edge of the reels were visible to the player. Using this basic five column three row array, the machine will generally offer the player about nine paylines of symbols.

Figure 1:
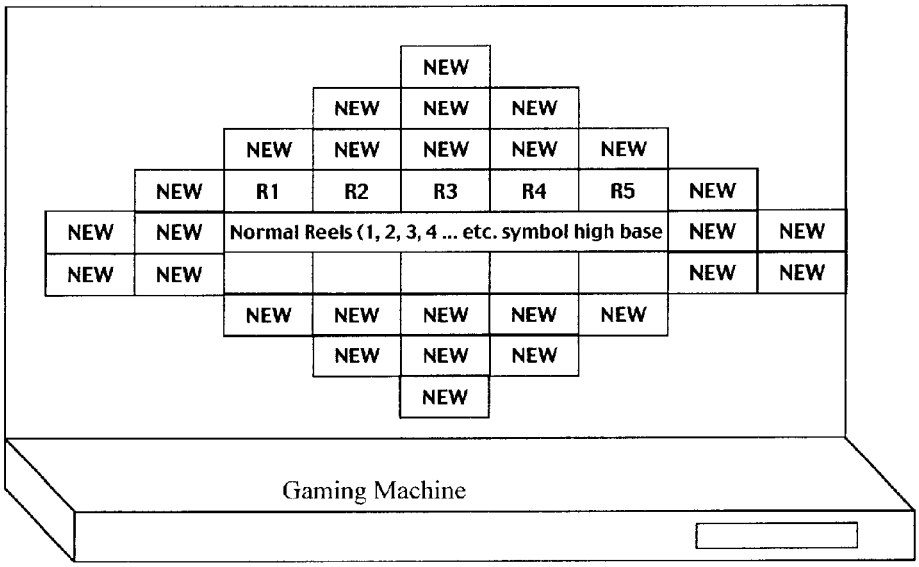
FIG. 1 shows a schematic representation of a gaming machine with a display screen showing an extended array of symbols in accordance with the present invention.
Figure 4:
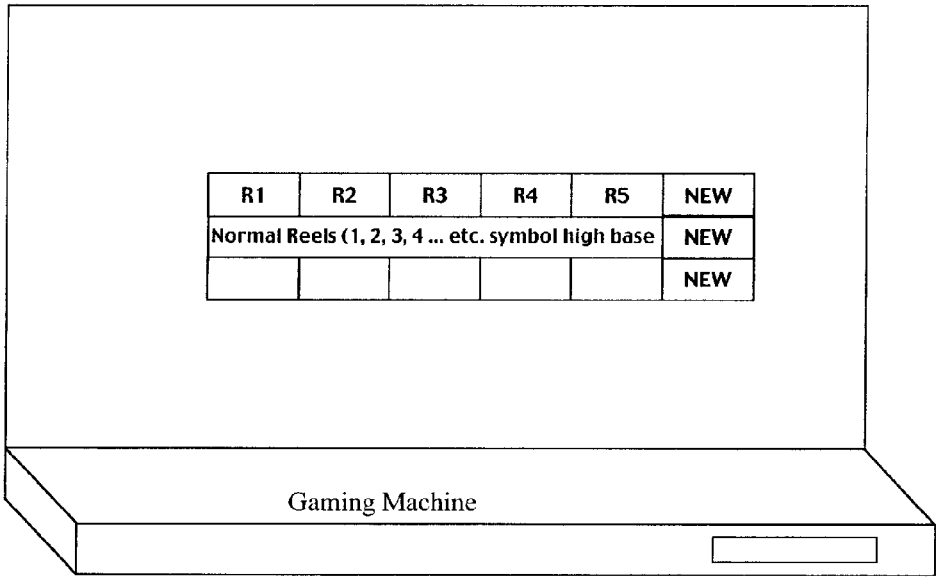
FIG. 4 shows a schematic representation of a gaming machine with a display screen showing an extended array of symbols in accordance with another embodiment of the present invention.

As shown in FIGS. 1 and 4, extending a row and/or a column allows extra paylines or an existing payline can be extended, thereby increasing the chances of a winning combination. Furthermore, the extended array also allows the machine to increase the number of winning combinations as well as the amount of winnings for particular combinations. For example, if the array is extended so that one of the paylines has six symbols, the machine can then offer a prize for six of a kind. The probability that this will occur is relatively slight, and so associated the prize is correspondingly high.

Figure 3:
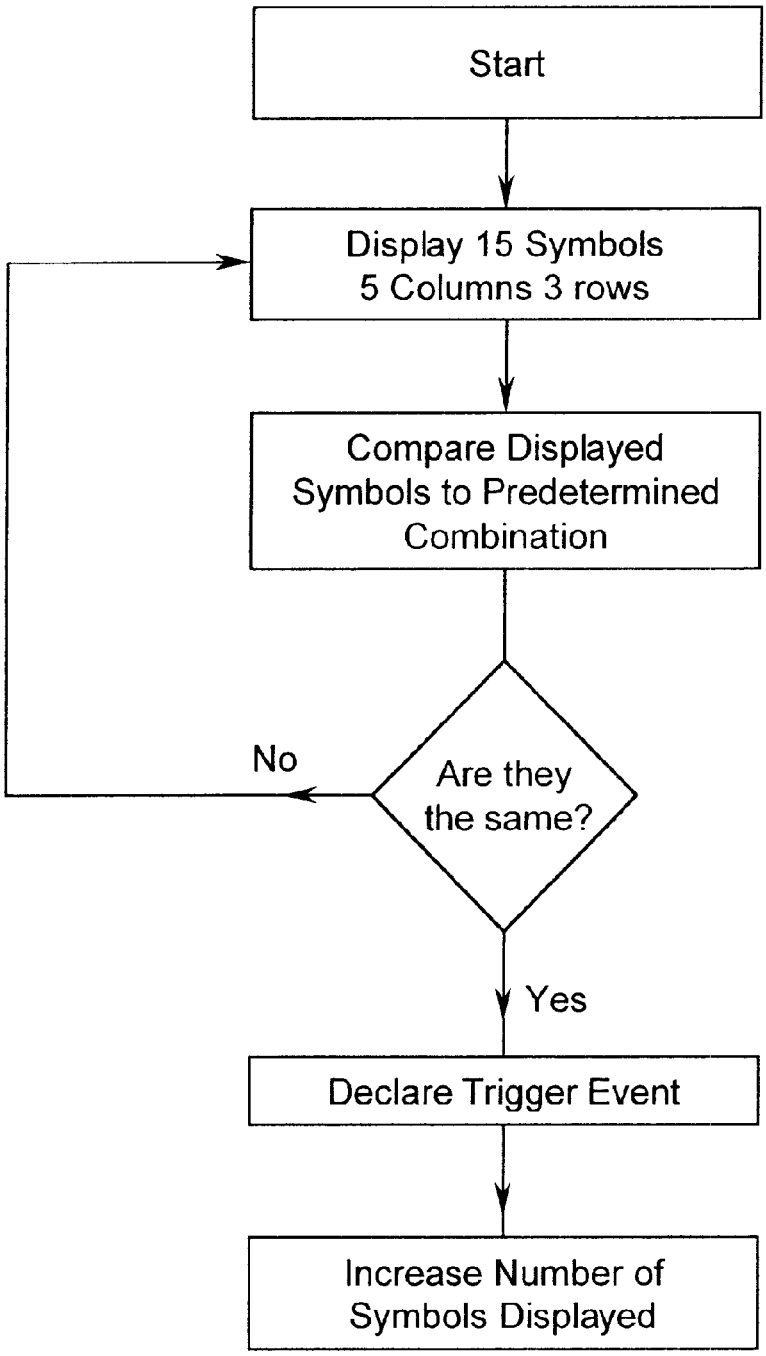
FIG. 3 is a flowchart showing the fundamental steps during the operation of the gaming machine.

The basic operation of this embodiment is shown in FIG. 3. The player plays the traditional base game until a predetermined combination of symbols occurs. It could be as simple as a certain scatter of symbols through the array. This triggers an extension of the array of the base game by one or more symbols. It will be appreciated that in some forms of the invention, the machine may be configured to arbitrarily choose where the array is to be extended, however, in other forms, the player determines the location of any additional symbols.

The present invention encompasses games begin with an array smaller than the traditional base game but allowing the player to extend the array over time. For example, the initial array may be only three columns by three rows. Over time the player is likely to trigger additional symbols and the array will grow and extend so that the paylines become more likely to yield a winning combination. Obviously, a payline of say eight symbols will show three of a kind more often than five symbol payline. In light of this, there would need to be some limits imposed on the size of any paylines. However, while the player is building the array toward its allowable limit, there is significant incentive to continue playing and not "waste" the effort taken to get the array to an intermediate stage.

In yet another embodiment, the gaming machine can be configured to provide additional arrays of standard or non-standard size. The additional arrays may appear in response to certain combinations appearing in the initial array or simply at the player's discretion. The additional array could play subsequently to the initial array to give a second chance at wining. Alternatively, the second (or third etc) array may play simultaneously to the first.

The game designer could choose whether the player must bet credits on the paylines of the bonus array or whether the bonus reels spin for 'free'. Furthermore, the bonus arrays themselves could trigger the appearance of still further arrays. The bonus arrays may be displayed for one free spin only, or may remain on screen until the credit meter is too low to allow betting on all the available arrays.

With the provision of gaming machines having the capability of departing from a single traditionally sized array, the playing options and therefore gaming enjoyment can be significantly enhanced.

The invention has been described herein by way of example only. Ordinary workers in this field will readily appreciate that the invention may be embodied in many other forms.

I claim:

[1. A gaming machine comprising:

a display for showing an initial array of randomly selected symbols, the array having an initial number of rows and columns of randomly selected symbols visible on the display, the gaming machine for paying winnings on the occurrence of predetermined winning combinations of symbols, wherein upon a trigger event, one or more additional symbols joining the array to increase the number of symbols displayed so that the machine can also pay winnings on winning combinations resulting from the increased number of symbols.]

[2. A gaming machine according to claim 1, wherein a single additional symbol is added to the array in response to the trigger event.]

[3. A gaming machine according to claim 1, wherein two or more symbols are added in response to a trigger event.]

[4. A gaming machine according to claim 1, wherein the increased number of symbols is provided by a new and separate array of the randomly selected symbols.]

[5. The gaming machine according to claim 4, wherein the trigger combination in any of the additional array will in turn trigger still further arrays to become available for gaming.]

[6. A gaming machine according to claim 1, wherein the array initially has five columns and three rows; and one or more additional symbols are added to extend the array upon a predetermined trigger event.]

[7. A gaming machine according to claim 1, wherein the trigger event is a predetermined combination of the symbols in the array.]

[8. The gaming machine according to claim 1, wherein a single additional symbol is added to produce an extended array in response to the trigger event.]

[9. The gaming machine according to claim 8, wherein the array initially has five columns and three rows.]

[10. The gaming machine according to claim 9, wherein the trigger event is a trigger combination of the symbols in the array.]

[11. The gaming machine according to claim 10, wherein upon a trigger combination in the extended array, the number of symbols displayed further increases to further extend the array.]

[12. The gaming medicine according to claim 1, wherein two or more symbols are added to produce an extended array in response to the trigger event.]

[13. The gaming machine according to claim 12, wherein the array initially has five columns and three rows.]

[14. The gaming machine according to claim 13, wherein the trigger event is a trigger combination of the symbols in the array.]

[15. The gaming machine according to claim 14, wherein upon a trigger combination in the extended array, the number of symbols displayed further increases to further extend the array.]

[16. The gaming machine according to claim 1, wherein the trigger event is a player actuated trigger provided on the control console.]

[17. A gaming machine comprising:

a display for showing an initial array of randomly selected symbols such that the gaming machine is for paying winnings on the occurrence of predetermined winning combinations of the symbols in the initial array; wherein, at least one additional row and/or column of random symbols appears on the display for gaming upon a the occurrence of predetermined trigger event.]

[18. A gaming machine according to claim 17, wherein the trigger event is one or more trigger combinations of symbols occurring in the initial array.]

[19. A gaming machine according to claim 18, wherein a trigger combination in any of the at least one additional row and/or column will in turn trigger still further at least one additional row and/or column to become available for gaming.]

[20. A gaming machine according to claim 17, wherein the trigger event is a player actuated trigger provided on the control console.]

*21. A computerized gaming machine comprising:*

*a video display; and*

*a computer coupled to the video display,*

*the computer configured to control the video display to show an initial array of randomly selected symbols, the initial array having an initial number of rows and columns of randomly selected symbols visible on the video display,*

*the computer configured to pay winnings on the occurrence of predetermined winning combinations of symbols; and*

*wherein upon a randomly-occurring trigger event, the computer configured to control the video display to show one or more additional randomly selected symbols joining the initial array by being added to a row or column of the initial array to produce an extended array of non-rectangular configuration by becoming newly visible and not replacing the initial array, to increase the number of symbols displayed so that the computer is configured to also pay winnings on winning combinations resulting from the increased number of symbols without the one or more additional symbols replacing the symbols of the initial array.*

*22. The gaming machine according to claim 21, wherein the trigger event is a predetermined combination of symbols in the initial array.*

*23. The gaming machine according to claim 21, wherein the trigger event is one or more predetermined combinations of symbols occurring in the initial array.*

*24. The gaming machine according to claim 21, wherein the computer is configured to pay winnings on winning combinations resulting from the increased number of symbols along new paylines.*

*25. The gaming machine according to claim 24, wherein the new paylines are part of the extended array.*

*26. The gaming machine according to claim 21, wherein the trigger event is a predetermined combination of symbols in the initial array, and the one or more additional randomly selected symbols comprises at least one additional row and/or column.*

*27. The gaming machine according to claim 26, wherein the computer is configured to pay winnings on winning combinations resulting from the increased number of symbols along extended paylines.*

*28. The gaming machine according to claim 27, wherein the computer is configured to pay an increased amount for a particular combination along the extended paylines.*

*29. The gaming machine according to claim 27, wherein the computer is configured to pay for an increased number of winning combinations along the extended paylines.*

*30. The gaming machine according to claim 21, wherein upon a randomly-occurring trigger event in the extended array, the number of symbols displayed further increases to further extend the extended array.*

*31. A computerized gaming machine comprising:*

*a video display; and*

*a computer coupled to the video display,*

*the computer configured to control the video display to show an initial array of randomly selected symbols,*

*the computer configured to paying winnings on the occurrence of predetermined winning combinations of the symbols in the initial array; and*

*the computer configured to control the video display to show at least one additional row and/or column of random symbols beyond the initial array joining the initial array by being added to the initial array to produce an extended array of non-rectangular configuration and appearing on the video display by becoming newly visible for gaming upon the occurrence of a predetermined randomly occurring trigger event so that the computer is configured to also pay winnings on winning combinations resulting from the at least one additional row and/or column without the at least one additional row and/or column replacing the symbols of the initial array.*

*32. The gaming machine according to claim 31, wherein the trigger event is one or more trigger combinations of symbols occurring in the initial array.*

*33. The gaming machine according to claim 32, wherein a trigger combination in any of the least one additional row and/or column will in turn trigger still further least one additional row and/or column to become available for gaming.*

* * * * *